US012560314B2

(12) United States Patent
Hierzer

(10) Patent No.: US 12,560,314 B2
(45) Date of Patent: Feb. 24, 2026

(54) ADAPTER FOR A TRACK LIGHTING SYSTEM AND LIGHTING ARRANGEMENT

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 0 days.

(21) Appl. No.: 18/910,680

(22) Filed: Oct. 9, 2024

(65) Prior Publication Data

US 2025/0122995 A1 Apr. 17, 2025

(30) Foreign Application Priority Data

Oct. 11, 2023 (AT) .............................. A 50831/2023

(51) Int. Cl.
*F21V 21/35* (2006.01)

(52) U.S. Cl.
CPC .................................... *F21V 21/35* (2013.01)

(58) Field of Classification Search
CPC ................................. F21V 21/35; F21V 21/34
USPC .......................................................... 362/648
See application file for complete search history.

(56) References Cited

U.S. PATENT DOCUMENTS 7,758,358 B1 7/2010 Mier-Langner et al.
8,794,817 B2 * 8/2014 Pearson .................. F21V 15/01 362/648
2023/0175680 A1 * 6/2023 Hendler .................. F21V 21/35 362/648

FOREIGN PATENT DOCUMENTS

CN 218242495 U 1/2023
DE 29917693 U1 4/2000
EP 3876365 A1 * 9/2021 ............ F21V 21/005

OTHER PUBLICATIONS

Machine translation of EP 3876365, Sep. 8, 2021, 25 pages. (Year: 2021).*
Office Action for related Austrian Application No. A 50831/2023 dated Jul. 12, 2024.
European Search Report dated Mar. 21, 2025 issued in corresponding EP 24204057 application (3 pages).

* cited by examiner

*Primary Examiner* — Laura K Tso
(74) *Attorney, Agent, or Firm* — Ross J. Christie; Millen, White, Zelano & Branigan, P.C.

(57) ABSTRACT

An adapter for a track lighting system includes a mounting track being shaped at least in sections to follow a curved path and being provided with at least one mounting slot along a longitudinal extension of the mounting track. The adapter can be inserted into the mounting slot for electrical contacting of a conductor device on the mounting track. The adapter comprises an adapter body which is divided into two or more adapter segments along a longitudinal extension of the adapter body, wherein in each case adapter segments adjacent to one another are connected to one another in a connecting region. The connecting region allows the adapter body to be flexibly bent about at least two bending axes, wherein the two bending axes are not parallel to each other and run non-parallel to the longitudinal extension of the adapter body.

21 Claims, 7 Drawing Sheets

ADAPTER FOR A TRACK LIGHTING SYSTEM AND LIGHTING ARRANGEMENT

BACKGROUND OF INVENTION

The invention relates to an adapter for a track lighting system with a mounting track being shaped at least in sections to follow a curved path, as well as to a lighting arrangement comprising at least one such adapter.

TECHNICAL BACKGROUND

Track lighting systems, which offer more variety and flexibility in the arrangement of lighting fixtures than, for example, permanently mounted individual luminaires, are already known as such.

The EP 3 876 365 A1 describes a light adapter for a track lighting system. The track lighting system comprises a mounting track configured to be curved at least in sections along a longitudinal extension. EP 3 876 365 A1 describes how an adapter body of the light adapter can be bent in order to be able to insert the light adapter practically and easily into the curved mounting track.

SUMMARY OF THE INVENTION

Against this background, it is the object of the present invention to provide an adapter for a track lighting system which enables even more flexible use together with curved mounting tracks and which, preferably, can also be manufactured in an expedient and simple manner. Furthermore, a lighting arrangement that has been improved accordingly is to be indicated.

According to the invention, this object is achieved by an adapter having the features of claim 1 and/or by a lighting arrangement having the features of claim 18.

What is proposed is an adapter for a track lighting system comprising a mounting track being shaped at least in sections to follow a curved path. The mounting track is provided with at least one mounting slot along the longitudinal extension thereof.

The adapter can be inserted into the mounting slot for electrical contacting of a conductor device on the mounting track. The adapter comprises an adapter body divided into two or more adapter segments along a longitudinal extension of the adapter body. In each case, the adapter segments adjacent to one another are connected to one another in a connecting region, wherein the connecting region enables the adapter body to be flexibly bent about at least two bending axes. The two bending axes are not parallel to each other and run non-parallel to the longitudinal extension of the adapter body. The adapter body is configured to be more flexible in the connecting region than in the area of the adapter segments.

Furthermore, according to the invention, a lighting arrangement is created with:

- a mounting track being shaped at least in sections to follow a curved path, being provided with at least one mounting slot along a longitudinal extension of the mounting track and comprising a conductor device;
- at least one adapter according to the invention, which is inserted into the mounting slot and is in electrical contact with the conductor device; and
- a lighting unit for generating light, which is coupled to the adapter and can be supplied by means of the adapter at least with electric power provided by the conductor device for operating the lighting unit or at least with electric power provided by the conductor device and a control signal provided by the conductor device.

One idea underlying the invention is to provide the adapter with bendability in two directions, allowing the adapter to be used even more flexibly in mounting tracks of various curved shapes. In particular, this makes it possible to insert the adapter into a mounting slot, which can be arranged on the curved mounting track in a wide variety of ways, wherein restrictions with regard to the possible orientation of a depth direction of the mounting slot and an inserting direction of the adapter in the cross-section of the mounting track are avoided.

By specifically equipping the adapter body with better bendability and flexibility in the connecting regions, the adapter segments as such can be configured to be more rigid and stiffer, which means that other components accommodated in the adapter segments can be well protected and held precisely. In addition, this configuration can contribute to simplifying the manufacturing of the adapter.

Advantageous embodiments and further developments of the invention are apparent from further sub-claims and from the description with reference to the figures.

In one embodiment, the two bending axes are substantially perpendicular to each other and/or run substantially perpendicular to the longitudinal extension of the adapter body. This allows the adapter to be used in a variety of ways with curved mounting tracks.

For example, the adapter body may comprise three adapter segments. In further embodiments, it is possible to imagine more than three adapter segments, for example four or five adapter segments. In this way, the flexible adaptability of the adapter to the course of the mounting track and/or the possibility of accommodating further components in the adapter body can be varied and improved.

In one embodiment, the connecting region(s) is/are each configured with at least one corrugation structure with corrugation peaks and corrugation troughs. In a further development, the directions of the crests of the corrugation peaks and the bottoms of the corrugation troughs run non-parallel, in particular substantially perpendicular, to the longitudinal extension of the adapter body. Bendability in the connecting regions is thus achieved in a way that is uncomplicated and cost-effective to manufacture.

In one embodiment, the connecting region(s) is/are each configured with at least one elastic intermediate portion. In particular, the elastic intermediate portion can be configured in the form of a plate or wall. This embodiment also enables bendability in the connecting regions in a practical and cost-effective manner.

In one embodiment, the adapter body comprises a box-like shape, wherein the adapter segments are each configured with a lid portion, side walls and an interior. In this way, the adapter segments make it possible to accommodate further components, for example electrical and/or electronic components, in particular for electrical contacting and supplying and/or controlling a lighting device.

The adapter body can thus be configured as a housing component of the adapter, for example as a one-piece housing component.

The lid portion and the side walls of the adapter segment can, in particular, each be configured integrally with one another. This can simplify production.

In one embodiment, mutually adjacent edge regions of the side walls of the mutually adjacent adapter segments are connected in the connecting region by a corrugation structure with corrugation peaks and corrugation troughs. In particular, the corrugation structure can be configured in one piece with the side walls connected by it. This further simplifies the manufacturing process.

In a further embodiment, mutually adjacent edge regions of the side walls of the mutually adjacent adapter segments are each connected in the connecting region by an elastic intermediate portion, in particular a plate-like or wall-like elastic intermediate portion. The intermediate portion can, for example, be configured integrally with the side walls connected thereto.

In a further development, crests of the corrugation peaks and bottoms of the corrugation troughs run substantially parallel to the side walls connected by the corrugation structure. Thus, good bendability around a bending axis parallel to the side walls is achieved. In particular, the directions of the crests and the bottoms run transversely, for example approximately perpendicular, to the longitudinal extension of the adapter body.

In one embodiment, the plate-like or wall-like elastic intermediate portion is configured as a substantially planar continuation of a main extension surface of one of the side walls in the direction of an adjacent one of the side walls. Thus, good bendability can be achieved with a simple shape.

In particular, in one embodiment, the corrugation structure may comprise at least two wavelengths, for example substantially two full wavelengths. This contributes to good bendability both about a bending axis that, for example, is substantially parallel to the crests and bottoms, and also about another bending axis that runs transversely to the crests and bottoms, for example, is substantially perpendicular.

In one embodiment, at least one flat carrier component is accommodated in the interiors of at least two adjacent adapter segments. The flat carrier component carries electrical conductors and, in particular, electronic components and/or electrical contacting devices. Furthermore, in this embodiment, the flat carrier components of the adjacent adapter segments are connected to each other and electrically coupled via a band-like or foil-like, flexible connection. In this way, an arrangement of electrical and/or electronic components housed in the adapter body can follow a bending of the adapter body without any problems or damage. The tape or foil-like connection is easy and inexpensive to produce.

In a further embodiment, the flat carrier component is accommodated in the interior in each case substantially parallel to the lid portion between the side walls. This can, for example, facilitate the arrangement of contact elements in such a way that the contact elements can contact the conductor device of the mounting track through recesses in both opposite side walls, as well as simplifying the assembly of the carrier component. For example, a single-sided carrier component can be used, such as a single-sided printed circuit board.

In one embodiment, the tape-like or film-like flexible connection in the connecting region is formed with a tape-like or film-like flexible material which carries conductive traces and is arranged bent in a U-shape in the connecting region. In particular, it may be provided that a bottom of the U-shape runs substantially parallel to the lid portions in an unbent state of the adapter. Due to the flexibility and ribbon- or foil-like nature of the material as well as the U-shape, this embodiment allows the adjacent carrier components to move relative to each other in the connecting region about more than one axis. Furthermore, the bottom of the U-shape can run transversely to the longitudinal extension of the adapter body in particular.

In one further development in particular, the U-shape is arranged in a transverse direction of the adapter between two of the corrugation structures of the connecting region. The material arranged in the form of a U thus provides flexibility in the connecting region, in which the corrugation structure allows the adapter body to be flexible and bendable.

In another further development, the U-shape is arranged in a transverse direction of the adapter between two of the elastic intermediate portions of the connecting region. In this way, the material arranged in the form of a U provides flexibility in the connecting region, in which the elastic, for example wall- or plate-like, intermediate portion allows the adapter body to be flexible and bendable.

In one embodiment, the adapter segments are each substantially closed on a side opposite the lid portion by means of a base element, wherein the base element is configured as a separate component in particular. For example, the bottom element can be latched to the side walls of the adapter segment. Components inside the adapter body can thus be housed even better protected.

In one embodiment, a gap is provided between facing narrow side edges of the lid portions of the adjacent adapter segments in an unbent state of the adapter body. In this case, the narrow side edge of a first of the lid portions is formed with a convex contour as seen in a main extension plane of the first lid portion and the narrow side edge of a second of the lid portions is formed with a concave contour as seen in a main extension plane of the second lid portion. In this embodiment, the convex and concave contours mesh with each other in such a way that the gap remains in the unbent state. This prevents the lid portions from colliding during bending or hindering the bending process. At the same time, it can be achieved that successive lid portions form a largely closed surface. In their interaction, the concave and convex contours facilitate, in particular, bending about a bending axis transversely to the main extension planes of the lid portions.

In a further embodiment, the narrow side edge of the second lid portion is provided with a chamfer within the concave contour. This additionally contributes to further facilitating bending about a bending axis substantially parallel to the main extension planes of the lid portions.

In a further development, the adapter body is made with at least one plastic material. The use of at least one plastic material contributes to the cost-effective manufacturing of a weight-saving component. In addition, a plastic material can provide electrically insulating properties as required.

In one embodiment, the neighboring adapter segments are connected in one piece in the connecting region. The number of individual components to be mounted can thus be avoided, which further simplifies manufacturing.

In one embodiment, the adapter body is configured in the adapter segments with a first material, in particular a first plastic material, and in the connecting regions with a second material, in particular a second plastic material, which is different from the first material. For example, the second material may comprise a higher elasticity than the first material. This means that the choice of material can be easily adjusted to the respective function of the adapter segment and connecting region. The second material can, for example, be configured as a rubber-like plastic in the solidified state, whereas the first material can be relatively rigid in the solidified state, for example. In particular, the corrugation structure(s) or the elastic intermediate portion(s) may be formed from the second material.

In an exemplary embodiment, the adapter body is manufactured by means of an injection molding process. In an alternative embodiment, the adapter body can be manufactured by means of 3D printing. Furthermore, in further embodiments, the bottom elements can also be formed from the one plastic material or the first plastic material. For example, the bottom elements can be injection-molded or 3D-printed. The use of an injection molding process enables cost-effective manufacturing, in particular in larger quantities, whereas a 3D printing process is well suited for components with complex geometries and avoids the need for an expensive casting tool, which can be an advantage for smaller quantities.

In particular, the first material and the second material can be processed jointly in the injection molding process or the 3D printing process during the manufacturing of the adapter body. Thus, injection molding or 3D printing of the areas formed with the first and second material can be carried out in one step, which is advantageous for efficient and cost-effective manufacturing.

In one embodiment, the path followed by the mounting track can be a flat curve, wherein at least in one portion of the mounting track a depth direction of the mounting slot deviates from a normal to the plane of the curve, for example lies in the plane or runs at an angle to it. In particular, the adapter according to the invention can be used advantageously with such a curved shape. However, the adapter according to the invention is also useful if the depth direction of the mounting slot runs normal to the plane of the curve.

In another embodiment, the path followed by the mounting track can be a three-dimensional curve, wherein at least in one portion of the mounting track a depth direction of the mounting slot deviates from a binormal of an accompanying tripod of the three-dimensional curve, for example runs along a main normal or lies in the normal plane spanned by the binormal and the main normal. However, the adapter according to the invention can also be used and is equally useful if the depth direction of the mounting slot runs along or parallel to the binormal. The adapter is therefore flexible and can be used in a variety of ways.

In one embodiment, the mounting track comprises at least two mounting slots, and the lighting arrangement comprises at least two of the adapters according to the invention, wherein the adapters are each inserted into one of the mounting slots within a portion of the mounting track within which the path is curved, at least in sections opposite one another. Thus, in a flexible and versatile way, the same type of adapter can be used in several mounting slots of the curved mounting track in the curved portion and can be differently bent.

Embodiments and developments of the invention can, where appropriate, be combined with one another as desired. Further possible embodiments, developments and implementations of the invention also comprise non-explicitly specified combinations of features of the invention which have been described above or below with respect to the exemplary embodiments. In particular, the person skilled in the art will also add individual aspects as improvements or additions to the respective basic form of the present invention.

SUMMARY OF THE DRAWING

The invention will be explained in more detail below on the basis of the exemplary embodiments specified in the schematic figures. In the drawings.

Figure 2:
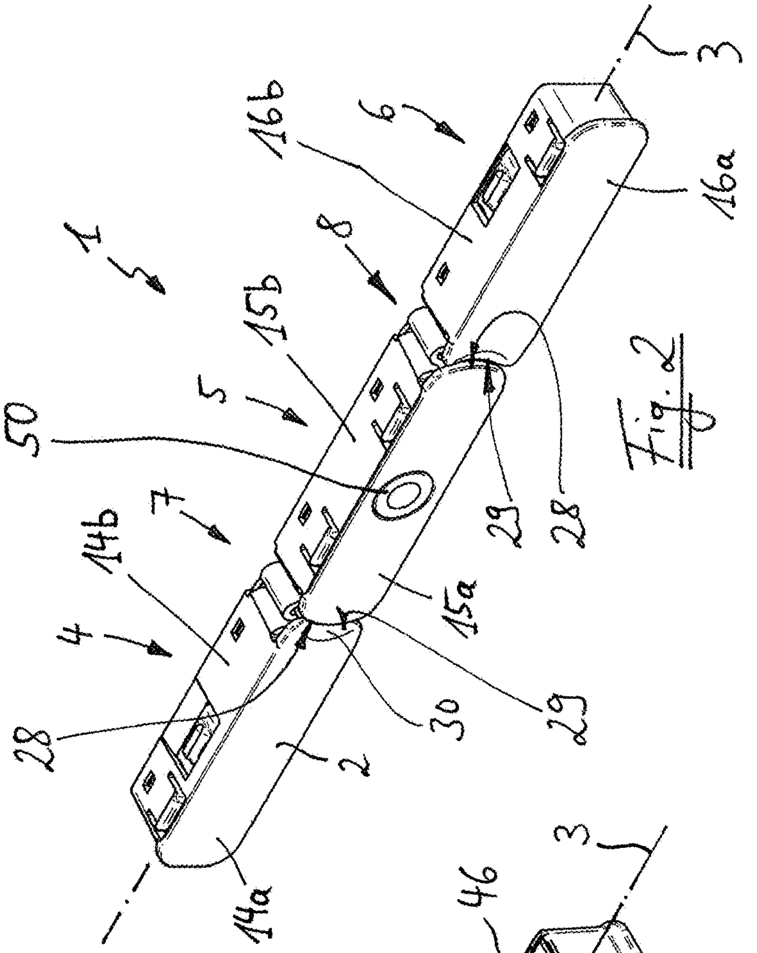
FIGS. 1 to 4 show perspective views of an adapter according to a first embodiment example, seen from four different longitudinal sides.
Figure 1:
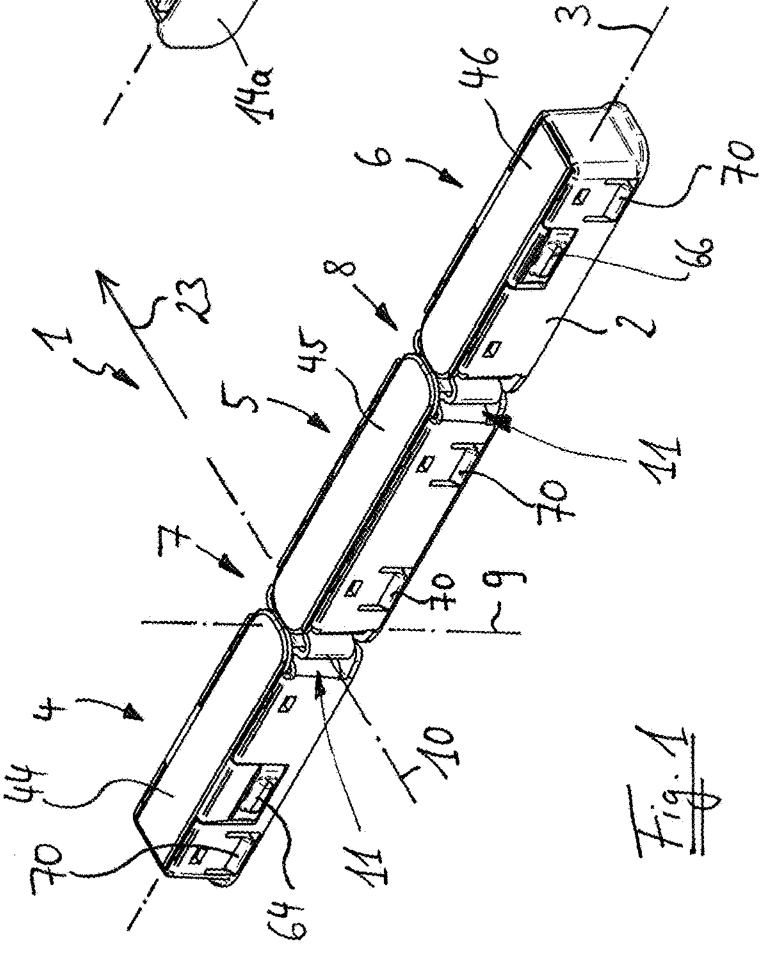
Figure 4:
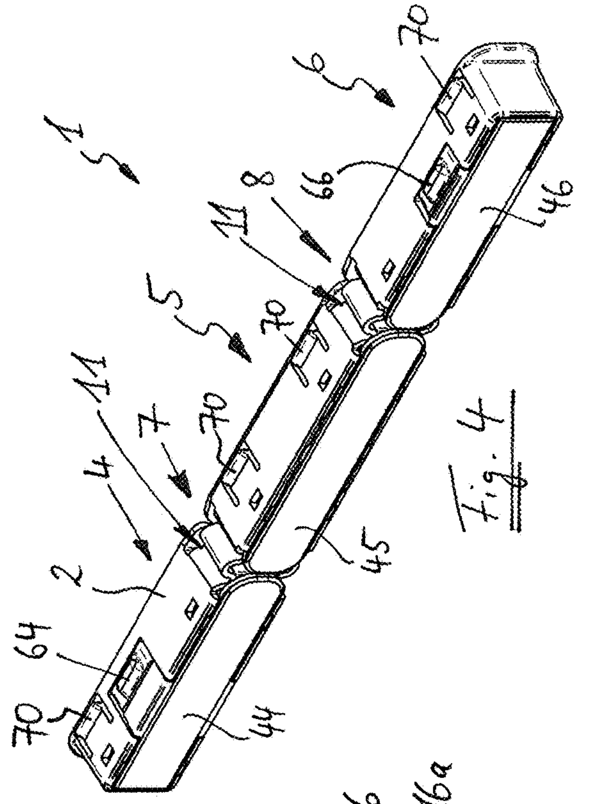
Figure 3:
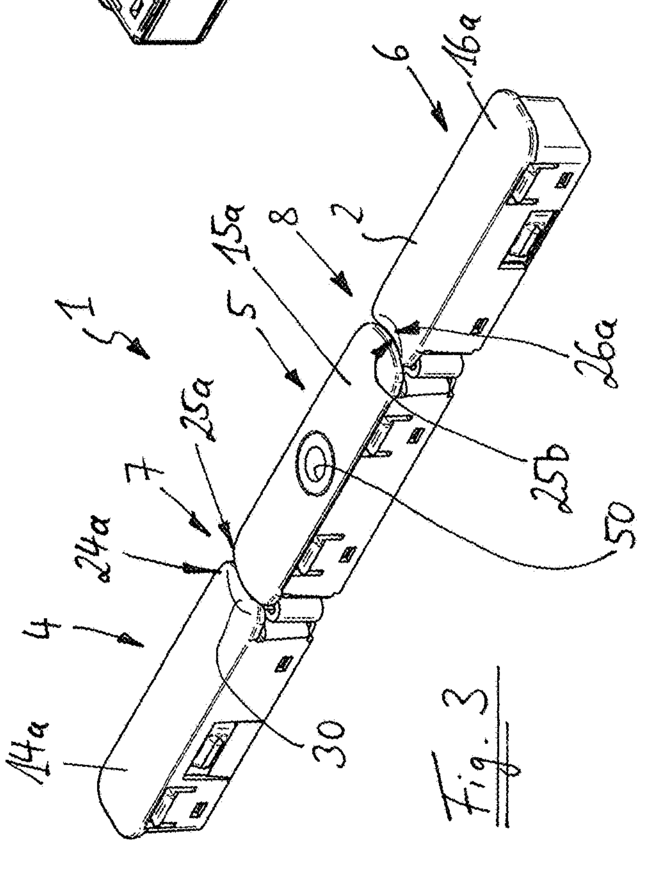

The enclosed figures are intended to provide a better understanding of the embodiments of the present invention. They illustrate embodiments and, together with the description, serve to explain principles and concepts of the invention. Other embodiments and many of the cited advantages emerge in light of the drawings. The elements of the drawings are not necessarily shown to scale in relation to one another.

In the figures, identical, functionally identical and identically acting elements, features and components are each provided with the same reference symbols unless stated otherwise.

DESCRIPTION OF EXEMPLARY EMBODIMENTS

FIGS. 1 to 4 show an adapter 1 for a track lighting system comprising an adapter body 2 which is divided into adapter segments 4, 5, 6 along a longitudinal extension 3 of the adapter body 2.

The adapter segments 4 and 5 adjacent to each other are connected to each other in a connecting region 7, and the adapter segments 6 and 5 are connected to each other in a further connecting region 8. The connecting regions 7 and 8 are constructed in the same way and each allow the adapter body 2 to be flexibly bent about at least a first bending axis 9 and a second bending axis 10, wherein the first and second bending axes 9, 10 each run substantially at a right angle, and thus normal, to the longitudinal extension 3. The bending axes 9 and 10 are also substantially perpendicular to each other. In particular, the second bending axis 10 extends along a transverse direction 23 of the adapter 1. It is understood that, in particular, two or more bending axes are possible, which are at different angles to each other and are not parallel to the longitudinal extension 3. The bending axes 9, 10 each run through the connecting regions 7 and 8, but are only shown for the connecting region 7 in FIG. 1 for the sake of clarity.

In the first embodiment example shown in FIGS. 1 to 15 and its variants, the adapter body 2 is configured with a one-piece component made of a plastic material and, for example, injection-molded or 3D-printed, forms a component of a housing of the adapter 1 and comprises an elongated box-like shape.

In the adapter segments 4, 5 and 6, the adapter body 2 is formed in each case with a plate-shaped lid portion 14*a*, 15*a*, 16*a*, substantially flat side walls 14*b*, 15*b*, 16*b* and end faces not described in more detail, wherein the side walls 14*b*, 15*b*, 16*b*, the lid portions 14*a*, 15*a*, 16*a* and, in the case of the adapter segments 4 and 6, in each case one of the end faces limit an interior 14*c*, 15*c* or 16*c* of the adapter segment 4, 5, 6 in each case. The lid portions 14*a*, 15*a*, 16*a*, side walls 14*b*, 15*b*, 16*b* and end faces are preferably formed integrally with one another in the adapter segment 4, 5 or 6.

In each of the connecting regions 7 and 8, mutually adjacent edge regions of the side walls 14*b*, 15*b* and 15*b*, 16*b* of the mutually adjacent adapter segments 4, 5 and 5, 6 are connected by a corrugation structure 11 with corrugation peaks 12 and corrugation troughs 13, wherein the corrugation structure 11 is manufactured in one piece with the side walls 14*b*, 15*b* and 15*b*, 16*b* connected by these. In the adapter body 2, the lid portions 14*a*, 15*a*, 16*a*, the side walls 14*b*, 15*b*, 16*b* together with the end faces and the corrugation structures 11 can be formed with the same plastic material.

Figure 5:
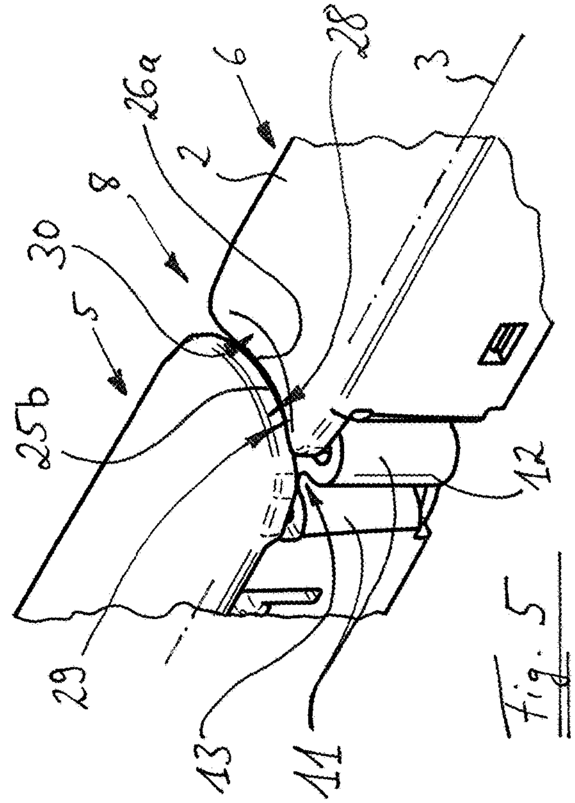
FIG. 5 shows a perspective detail view of a connecting region of two adapter segments according to the first embodiment example of FIGS. 1 to 4.
Figure 6:
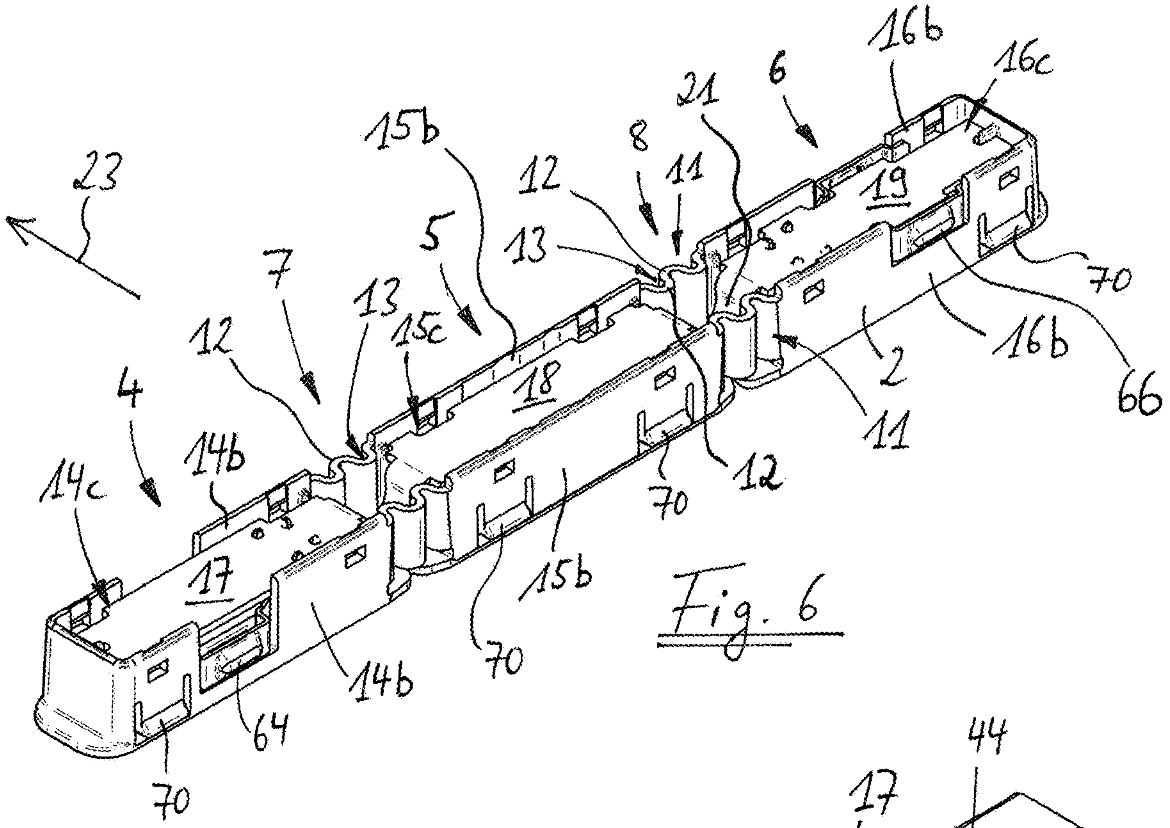
FIG. 6 shows a perspective view of the adapter of FIGS. 1 to 4 with one side open.
Figure 7:
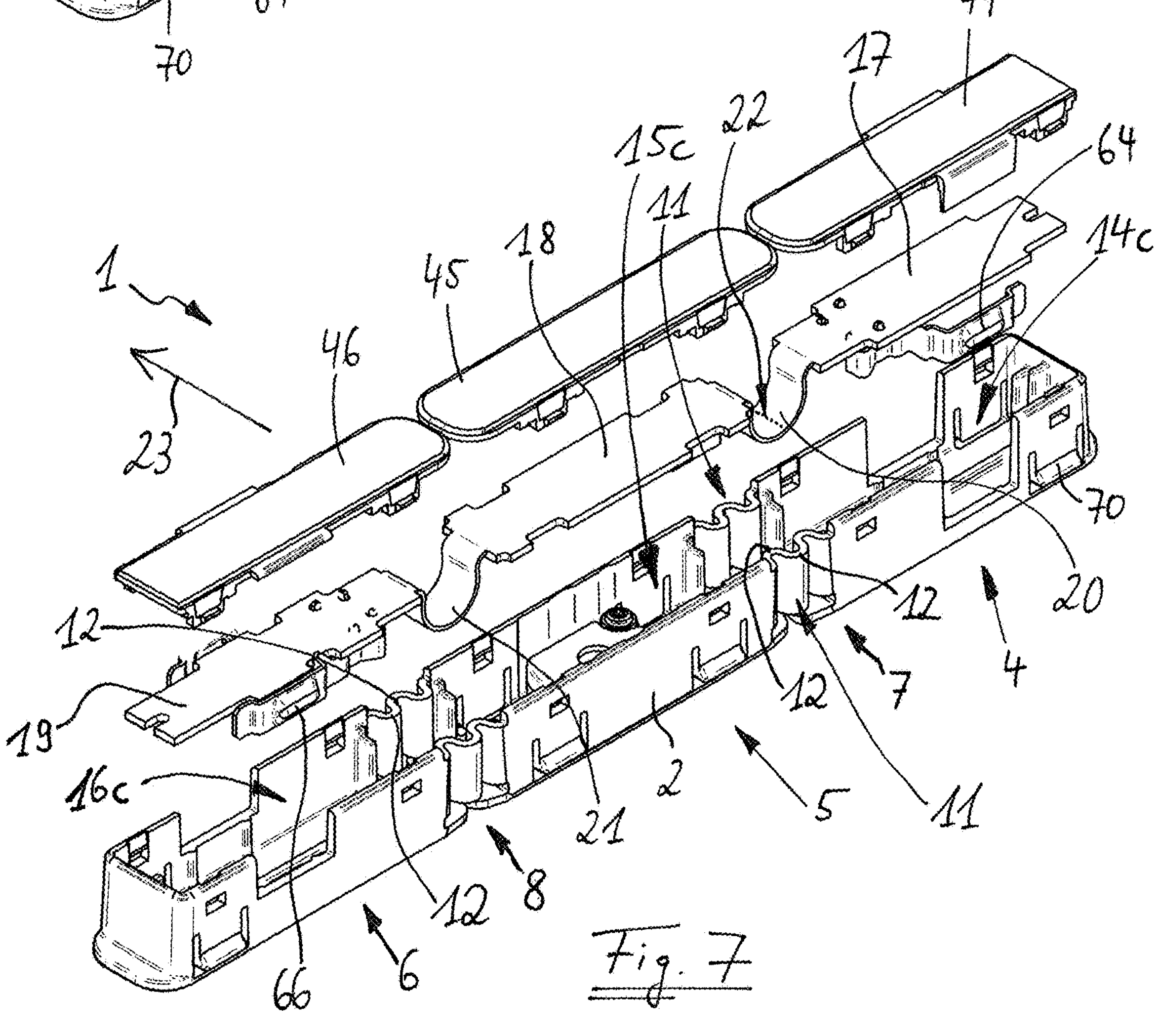
FIG. 7 shows a perspective exploded view of the adapter of FIGS. 1 to 4.

The corrugation structure 11 is also clearly recognizable, in particular in FIGS. 5 to 7, and in each case comprises substantially two full wavelengths to enable a high degree of flexibility and bendability in the connecting regions 7, 8. In variants, however, the number of corrugation peaks and troughs 12, 13 can be modified in comparing with the design shown in the figures.

Directions of crests of the corrugation peaks 12 and of bottoms of the corrugation troughs 13 extend in each case transversely, in particular approximately perpendicularly, to the longitudinal extension 3 of the adapter body 2, and thus run in each case substantially parallel to the side walls 14*b*, 15*b* and 15*b*, 16*b* connected by the corrugation structure 11. In some variants, one or more of the crests and/or bottoms can deviate in their orientation by a few degrees from a normal to the longitudinal extension 3, for example by up to 5 degrees.

The corrugation structures 11 enable the adapter body 2 to be bent about two axes in the connecting regions 7, 8, in particular about both the first bending axis 9 and the second bending axis 10. In the figures, the directions of the crests of the corrugation peaks 12 and the bottoms of the corrugation troughs 13 run substantially parallel to the first bending axis 9 and substantially normal to the second bending axis 10.

The adapter body 2 is configured more flexibly in the connecting region 7 and 8 than in the region of the adapter segments 4, 5, 6 by means of the corrugation structures 11. In this way, good bendability of the adapter 1 can be achieved, while at the same time components housed within the interiors 14*c*, 15*c*, 16*c* of the relatively rigid and stiff adapter segments 4, 5, 6 outside the connecting regions 7, 8 are well protected. Components housed in this way are explained in more detail below.

A flat carrier component 17, 18, 19 is accommodated in each of the interiors 14*c*, 15*c*, 16*c* and can be held there reliably and precisely due to the relatively rigid design of the adapter segments 4, 5, 6, comparing with the connecting regions 7 and 8. The carrier components 17, 18, 19 are preferably configured as printed circuit boards and each carry electrical conductors. On at least one of the carrier components 17, 18 and 19, electronic components may be provided which serve for the electrical supplying of a lighting unit 150 which can be coupled or is coupled to the adapter 1 and/or are used in the control of the lighting unit 150 by means of one or more control signal(s) which can be accommodated by the adapter 1. In the figures, the carrier component 17 carries two resilient contact elements 64 and the carrier component 19 carries two resilient contact elements 66. The contact elements 64 each protrude through an associated recess in one of the opposing side walls 14*b*, while the contact elements 66 each protrude through an associated recess in one of the opposing side walls 16*b*. The carrier components 17, 18, 19 can, for example, be fitted on one side, in FIGS. 6 to 9 on the underside.

The carrier components 17 and 18 as well as 18 and 19 are each electrically coupled and connected in the connecting region 7 or 8 by a flexible connection 20 or 21 configured like a strip or film. The connection 20 and 21 is formed in each case with a tape-like or film-like, flexible material, for example an insulating plastic tape or an insulating plastic film, wherein this material carries conductive traces and is arranged bent in a U-shape in the connecting region 7, 8, see in particular FIGS. 6 to 9.

The substantially planar, plate-like support components 17, 18 and 19 are accommodated in the interior 14*c*, 15*c* and 16*c*, respectively, substantially parallel to the lid portion 14*a*, 15*a* and 16*a*, respectively, between the opposing side walls 14*b*, 14*b* and 15*b*, 15*b* and 16*b*, 16*b*, respectively. In the unbent state of the adapter 1, a bottom 22 of the U-shape runs substantially parallel to the lid portions 14*a*, 15*a*, 16*a* and substantially transversely to the longitudinal extension 3.

The arrangement of electrical and/or electronic components housed in the adapter body 2 with the help of the carrier components 17, 18, 19 thus follows a bending of the adapter body 2 without damage and reliably. The tape or film-like connection 20 and 21 can be manufactured relatively easily and inexpensively. The tape-like or foil-like material of the connections 20, 21 can be connected to the carrier components 17, 18 or 18, 19 at their mutually facing edges or can continue into the carrier components 17, 18, 19. The plate-like carrier components 17, 18, 19 and the connections 20, 21 can be configured together as a said rigid-flex PCB, wherein PCB stands for printed circuit board.

FIGS. 6 and 7 further show that the tape-like or foil-like, flexible connections 20 and 21 are each arranged, in the transverse direction 23 of the adapter 1, between two of the corrugation structures 11. The flexible connections 20, 21 thus enable bending in interaction with the corrugation structures 11, in particular about the bending axes 9, 10.

In the area of each of the adapter segments 4, 5 and 6, the adapter body 2 is closed on a side opposite the lid portion 14*a*, 15*a* and 16*a* by a bottom element 44, 45 or 46, see in particular FIGS. 1, 4, 7, 8. The bottom elements 44, 45, 46 are separate components, for example made of a plastic material, in particular injection-molded or 3D-printed. The bottom elements 44, 45 and 46 are latched to the side walls 14*b*, 15*b* or 16*b* of the adapter segment 4, 5, 6, to which the bottom element 44, 45, 46 is assigned in each case.

Figure 8:
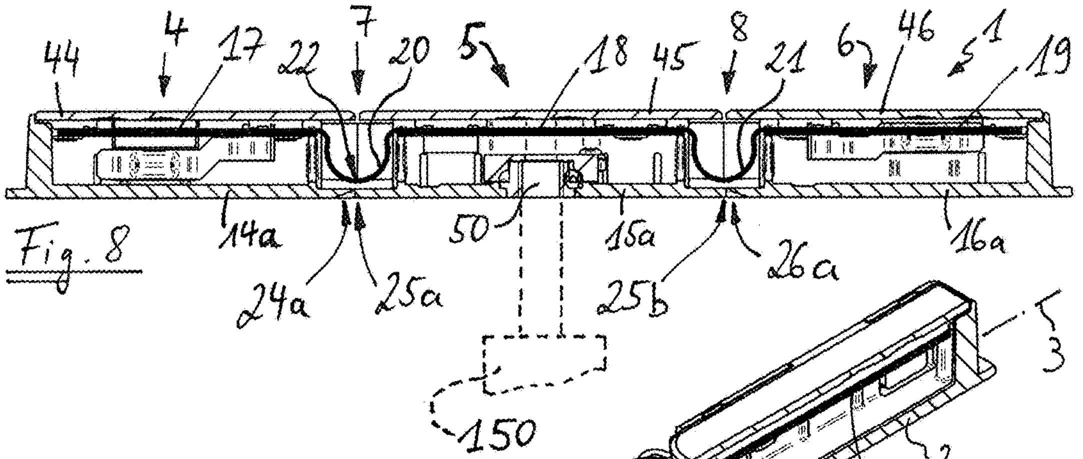
FIG. 8 shows a view of the adapter of FIGS. 1 to 4 in a longitudinal center section, as well as a schematically sketched lighting unit.
Figure 9:
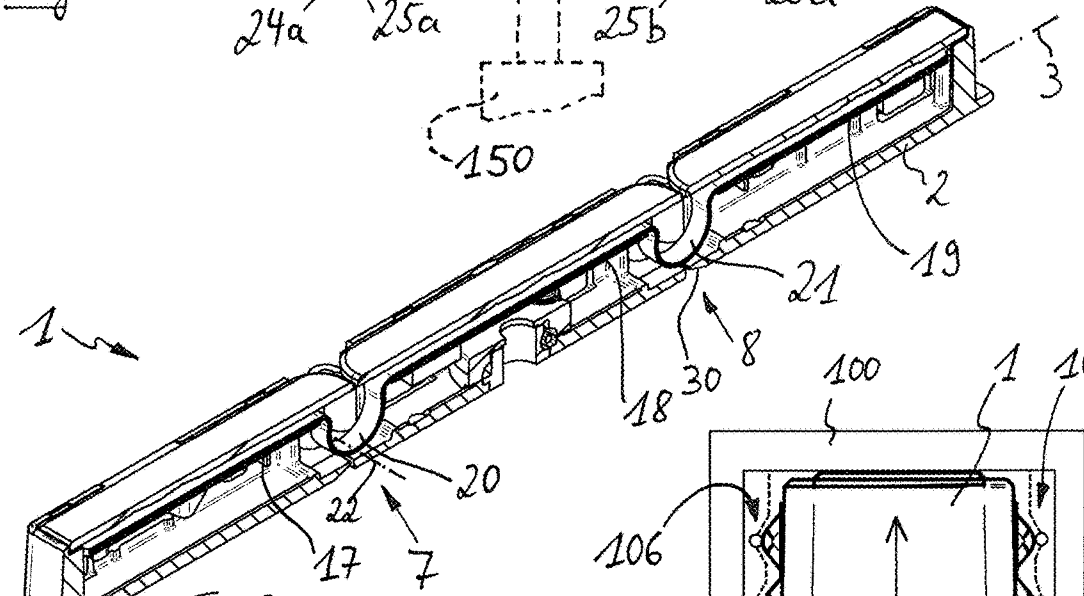
FIG. 9 shows a perspective view of the adapter of FIGS. 1 to 4, cut along a longitudinal center plane thereof.

In the lid portion 15*a*, the middle adapter segment 5 comprises, for example by means of a center, a coupling device 50, which serves for an electrical coupling, or an electrical and mechanical coupling, of the adapter 1 with a lighting unit 150. The lighting unit 150 is shown in FIG. 8 as a purely exemplary and schematic sketch and can be configured in a wide variety of ways. The coupling by means of the coupling device 50 can be fixed or detachable.

Narrow side edges of the bottom elements 44 and 45 as well as 45 and 46 facing one another, which are not designated in more detail, are each configured with a convex contour, wherein a space remains between the bottom elements 44, 45 as well as 45, 46 in the unbent state of the adapter 1, see for example FIGS. 7 and 8.

A gap is provided between facing narrow side edges 24*a* and 25*a* of the lid portions 14*a* and 15*a*, and between facing narrow side edges 25*b* and 26*a* of the lid portions 15*a* and 16*a* in the unbent state of the adapter body 2 and thus of the adapter 1.

The narrow side edges 24*a* and 26*a* are each provided with a concave contour 29 as seen in a main extension plane of the lid portion 14*a* and 16*a*, respectively, and are additionally configured with a chamfer 30 in the thickness direction of the lid portion 14*a* and 16*a* in the region of the concave contour 29. The narrow side edges 25*a* and 25*b* are each provided with a convex contour 28 as seen in a main extension plane of the lid portion 15*a*.

The convex contour 28 and the concave contour 29 mesh with each other in the connecting regions 7 and 8 in such a way that the gap between the contours 28 and 29 remains in the unbent state. When bending the adapter 1, the lid portions 14*a*, 15*a*, 16*a* are thus prevented from colliding with each other, at least within a defined range of radii of curvature. At the same time, the lid portions 14*a*, 15*a*, 16*a* on the upper side of the adapter 1 in FIG. 3 connect to each other neatly and with small gaps between them.

Figure 10:
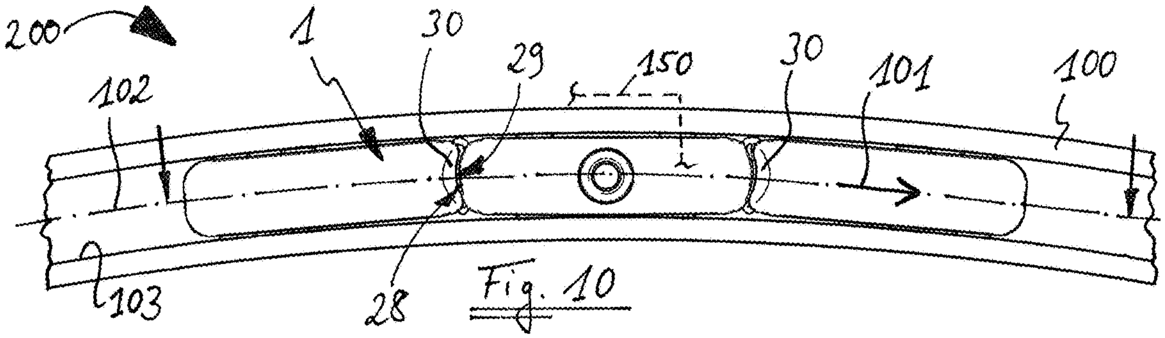
FIG. 10 shows a portion of a lighting arrangement according to a variant of the first embodiment example, with a curved mounting track, an adapter inserted into a mounting slot of the same according to FIGS. 1 to 4 and a schematically sketched lighting unit.
Figure 12:
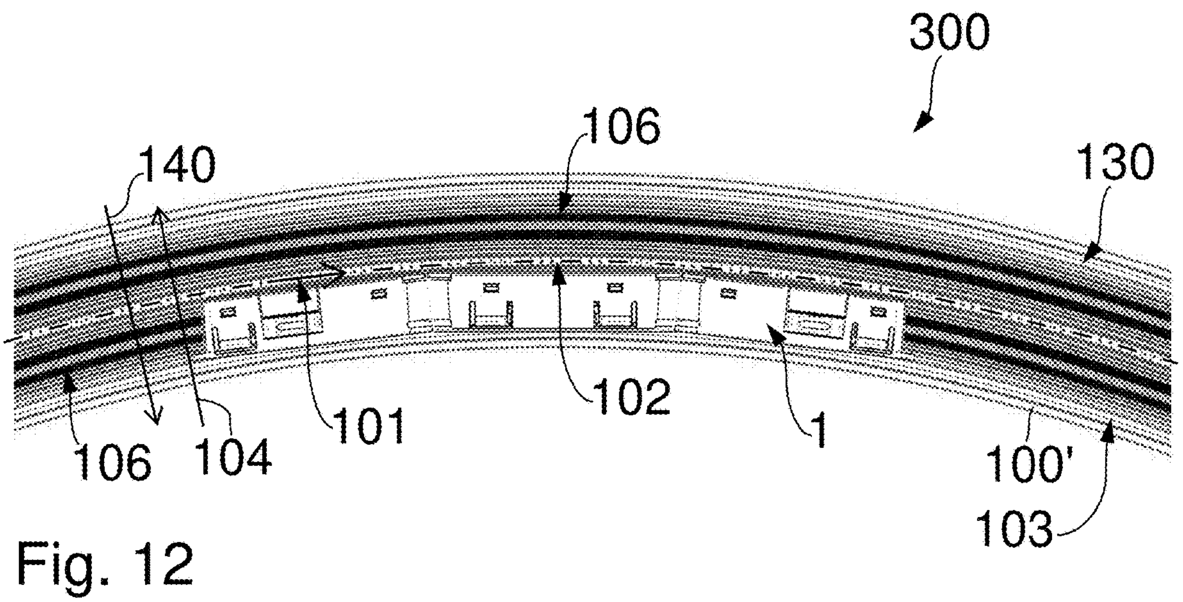
FIG. 12 shows a longitudinal center section of a mounting track in a portion of a lighting arrangement with the adapter of FIGS. 1 to 4 inserted, according to a further variant of the first embodiment example.
Figure 14:
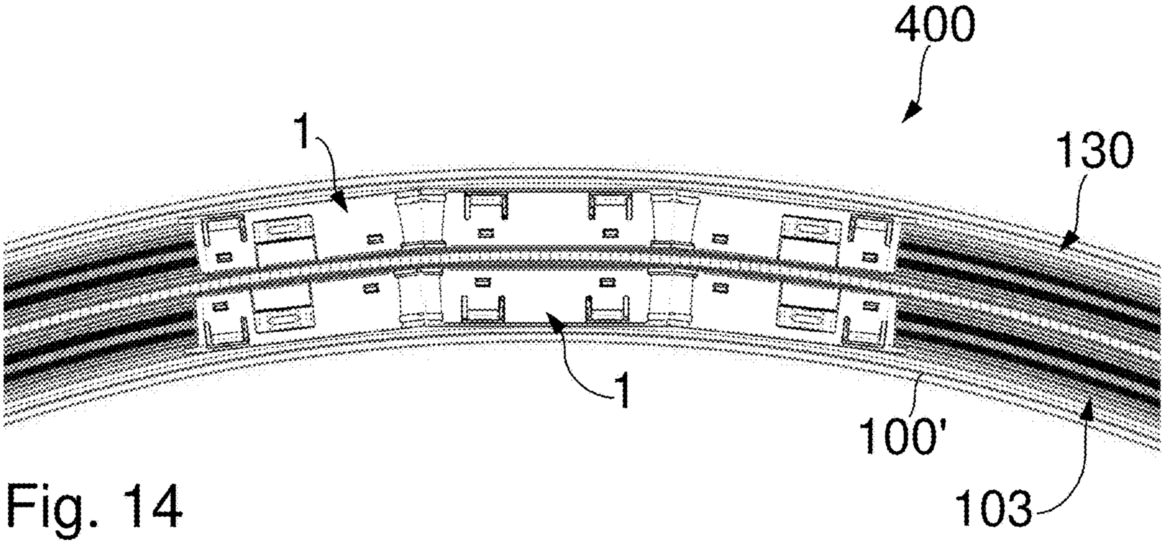
FIG. 14 shows a longitudinal center section of a mounting track in a portion of a lighting arrangement, with two adapters inserted opposite each other according to FIGS. 1 to 4, according to an even further variant of the first embodiment example.
Figure 15:
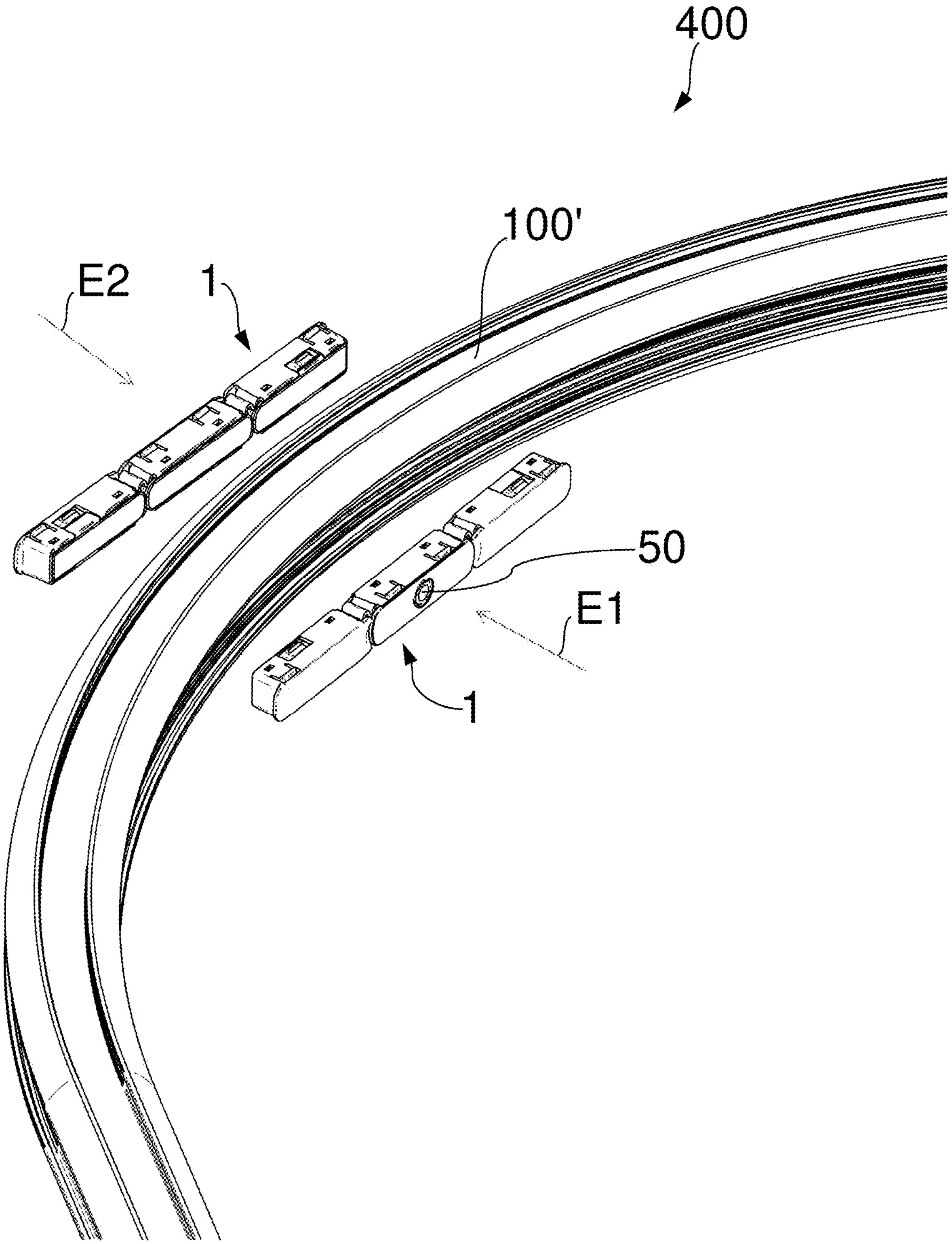
FIG. 15 shows a perspective view of a curved portion of the lighting arrangement of FIG. 14. during the insertion of the two adapters.

The adapter 1 is part of a track lighting system and is used to set up a lighting arrangement, for example to set up a lighting arrangement 200 according to the variant in FIG. 10, to set up a lighting arrangement 300 according to the further variant in FIG. 12, or to set up a lighting arrangement 400 according to the still further variant in FIGS. 14 and 15.

Figure 11:
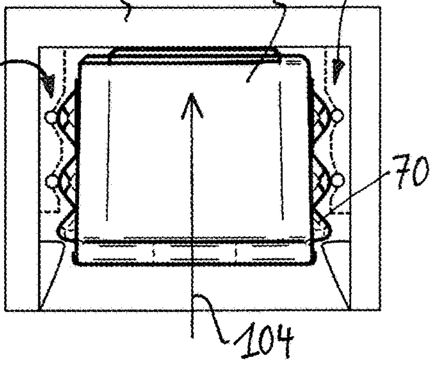
FIG. 11 shows a schematic cross-sectional view of a mounting track of the lighting arrangement of FIG. 10 with the inserted adapter of FIGS. 1 to 4.

In the variant of FIGS. 10, 11, the track lighting system comprises at least one mounting track 100, which follows a path 101 with a longitudinal extension 102 thereof. The path 101 is hereby curved at least in sections. Along the longitudinal extension 102, the mounting track 100 comprises an elongated mounting slot 103 with a depth direction 104.

The adapter 1 can be inserted into the mounting slot 103, thereby being mechanically coupled to the mounting track 100 and contacting a conductor device 106 arranged within the mounting slot 103, see FIG. 11, by means of the contact elements 64 and 66. The conductor device 106 is exemplarily provided in two parts on both sides of the inserted adapter 1 in the mounting slot 103 and provides an electrical supply voltage, in particular low voltage, as well as a control signal, for example a DALI signal. Mechanically, the adapter 1 is held in a latching manner on the mounting track 100 by means of latching elements 70, which are configured in particular in one piece with the side walls 14*b*, 15*b*, 16*b*.

The exemplary lighting arrangement 200 based on the track lighting system comprises the mounting track 100, the adapter 1 inserted into the mounting slot 103 and making electrical contact with the conductor device 106, and the lighting unit 150. The lighting unit 150 is used for generating light, is coupled to the adapter 1, for example carried by the adapter 1, and is supplied by means of the adapter 1 with the electric power provided by the conductor device 106 for operating the lighting unit 150 and with the control signal provided by the conductor device 106, or is controlled on the basis of the control signal.

The adapter 1 can be used in a flexible and versatile manner in mounting tracks 100 that are curved in different ways. The mounting track 100 can be curved in a plane or in space. Here, the mounting slot 103 can open outwards at a wide variety of points in the cross-section of the curved mounting track 100. The adapter 1 can be reliably used with such mounting slots 103 due to its bendability about at least two bending axes, such as the bending axes 9 and 10, which run non-parallel and in particular transversely to the longitudinal extension 3.

For example, if the path 101 is a planar curve, at least in one portion of the mounting track 100, the depth direction 104 of the mounting slot 103 may deviate from a normal to the plane of the curve, for example lie in the plane of the curve or be splayed at an angle to it. The adapter can also be used advantageously if the depth direction 104 runs normal to the plane of the curve.

If, on the other hand, the path 101 is a three-dimensional curve, the depth direction 104 can deviate from a binormal of an accompanying tripod of the three-dimensional curve, for example run along a main normal or lie in the normal plane spanned by the binormal and the main normal, at least in one portion of the mounting track 100. The adapter 1 can be used in the same way if the depth direction 104 runs along the binormal or parallel to it.

In the lighting arrangement 200 shown in FIG. 10, the adapter 1 inserted into the mounting slot 103 is bent around the first bending axis 9 due to the curvature of the path 101. Only one portion of the curved mounting track 100 is shown as an example. In lighting arrangements according to other advantageous embodiments, the mounting track 100 or a portion thereof and thus the path 101 can instead be curved in such a way that the inserted adapter 1 is bent in the connecting regions 7, 8 about the second bending axis 10 or simultaneously about both the first bending axis 9 and also about the second bending axis 10.

In the lighting arrangement 300 according to the further variant shown in sections in FIG. 12 in the longitudinal center section, a modified mounting track 100' is provided, which comprises mounting slots 103 and 130 on opposite longitudinal sides of the same. The mounting track 100' is thus provided with two mounting slots 103, 130, wherein an adapter 1 can be inserted into each of the mounting slots 103, 130. In particular, each of the two mounting slots 103, 130 is provided with a conductor device 106, for example analogous to FIG. 11, which can be electrically contacted by the contact elements 64, 66 of the respective adapter 1 in order to tap a supply voltage and, in particular, a control signal. FIG. 12 also shows a depth direction 104 of the mounting slot 103, which exemplarily opens from an inner radius of the curved mounting track portion 100', and a depth direction 140 of the mounting slot 130, which exemplarily opens from an outer radius of the curved mounting track portion 100'.

FIG. 12 shows an adapter 1 inserted into the mounting slot 103. In order to follow the curvature of the path 101 of the mounting track 100', the adapter 1 is bent about the second bending axis 10 in each of the connecting regions 7, 8. The adapter 1 bent in this way is shown again separately in FIG. 13.

Figure 13:
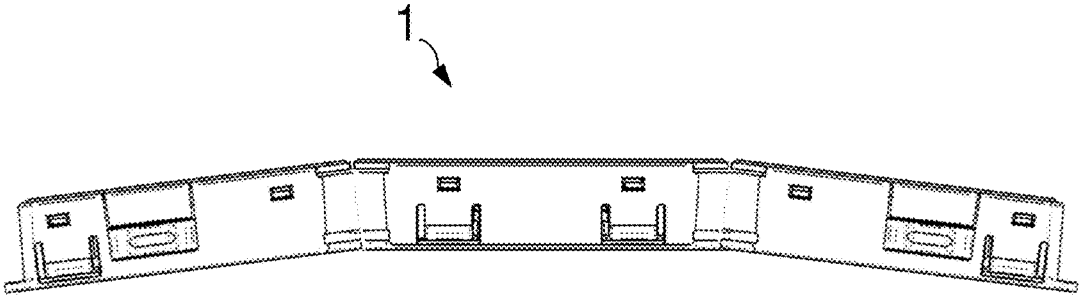
FIG. 13 shows a side view of the adapter of FIGS. 1 to 4 in a bent state, as the adapter is used as an example in the lighting arrangement of FIG. 12.

Instead of the bend shown in FIG. 13, the adapter 1 can also be bent in the other direction in the connecting regions 7, 8 around the bending axis 10 compared to FIG. 13. FIG. 14 illustrates the lighting arrangement 400, in which two adapters 1 are arranged opposite each other in the curved portion of the mounting track 100'. Here, one of the adapters 1 is inserted into the mounting slot 103 and bent as shown in FIG. 12. The other adapter 1 is inserted into the mounting slot 130 and is thus bent in the opposite direction to the adapter 1 inserted into the mounting slot 103 in the connecting regions 7 and 8 about the second bending axis 10. In addition, please refer to the comments on FIG. 12 above.

The insertion of one of the adapters 1 into the mounting slot 103 along a first inserting direction E1, for example substantially parallel to the depth direction 104 at the location of the center of the one adapter 1, and the insertion of the second of the adapters 1 into the mounting slot 130 along a second inserting direction E2, for example substantially parallel to the depth direction 140 at the location of the center of the second adapter 1, is shown in perspective in FIG. 15. FIG. 15 shows the adapter 1 in its unbent state.

Figure 16:
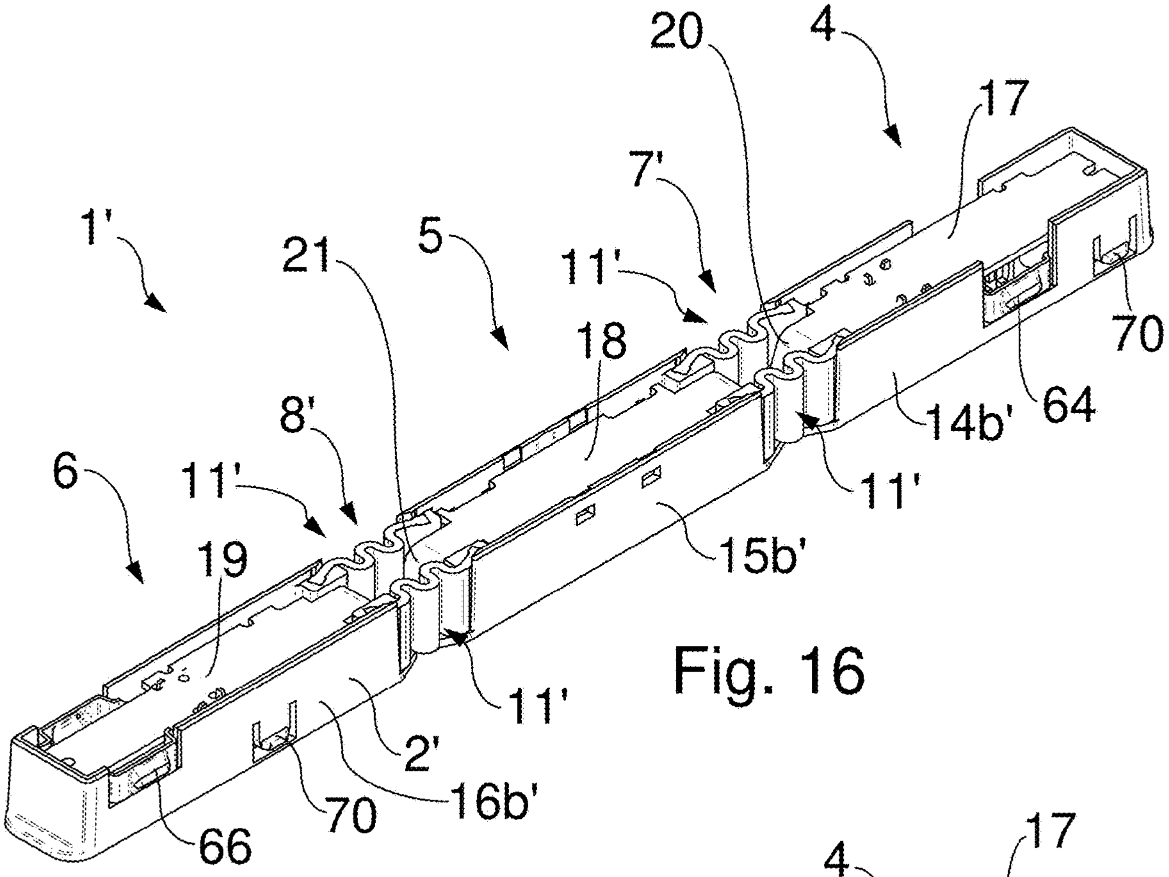
FIG. 16 shows a perspective view of an adapter according to a second embodiment example, with one side open.

An adapter 1' according to a second embodiment example is shown in FIG. 16. In the following, its differences are explained in comparison with adapter 1, wherein the explanations above for adapter 1 are also applicable to adapter 1'. As described above, the adapter 1' can be used as part of a track lighting system in a lighting arrangement, for example in a lighting arrangement 200, 300 or 400 as outlined in FIGS. 10 to 15.

The adapter 1' differs from the adapter 1 in that an adapter body 2' is provided in FIG. 16, which is formed with a first plastic material and a second plastic material, wherein the first and second plastic materials are different. In particular, the adapter body 2' is formed with a one-piece component injection-molded or 3D-printed from the first and second plastic materials in a single pass. The second plastic material is more elastic than the first plastic material. While the first plastic material, which is relatively rigid after solidification, is used in the area of the adapter segments 4, 5 and 6, the second plastic material, which is elastic and, for example, rubber-like after solidification, is used in the connecting regions 7' and 8' to form the corrugation structures 11'. The corrugation structures 11' are firmly connected in one piece to the adjacent side walls **14*b*', 15*b*' or 15*b*', 16*b*' of the adapter segments 4, 5 or 5, 6** during manufacturing, in particular by injection molding or 3D printing.

The more pliable, more flexible material of the corrugation structures 11' further improves the advantageous bendability of the adapter 1', in particular around the bending axes 9 and 10. For bottom elements 44, 45, 46 not shown in FIG. 16, for example, the first, relatively rigid plastic material is also used in the adapter 1'.

Figure 17:
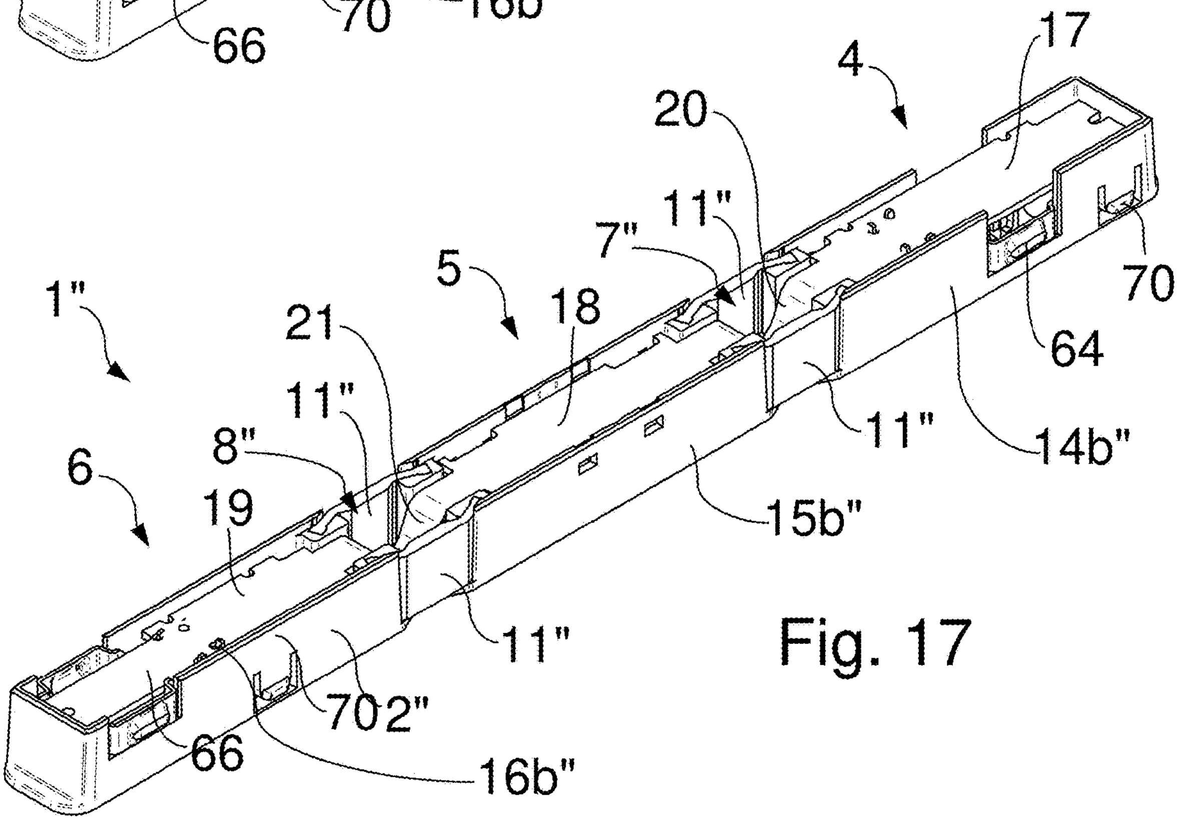
FIG. 17 shows a perspective view of an adapter according to a third embodiment example, with one side open.

FIG. 17 shows an adapter 1" according to a third embodiment example, which in turn is modified compared to the first embodiment example. In the following, the differences of the adapter 1" are explained in comparing with the adapter 1, wherein reference is again made to the above explanation of the adapter 1 according to the first embodiment example. As described above, the adapter 1" can be used as part of a track lighting system in a lighting arrangement, for example in a lighting arrangement 200, 300 or 400 as shown in FIGS. 10 to 15.

The adapter 1" comprises an adapter body 2", which is divided along the longitudinal extension 3 into the adapter segments 4, 5, 6. In the third embodiment example, the adapter segments 4, 5, 6 are connected in connecting regions 7", 8", wherein the connecting regions 7", 8" in turn enable bending about two mutually non-parallel bending axes, which run non-parallel and in particular transversely to the longitudinal extension 3, in particular about the first and second bending axes 9, 10.

Analogous to the second embodiment example, the adapter body 2" is formed with a first plastic material and a second plastic material, wherein the first and second plastic materials are different and wherein the second plastic material is more elastic than the first plastic material. The first plastic material is thus relatively rigid, whereas the second plastic material is configured to be elastic and, in particular, rubber-like. In the third embodiment example, two substantially flat, wall- or plate-like elastic intermediate portions 11" are provided in each of the connecting regions 7", 8". The intermediate portions 11" connect mutually adjacent edge regions of the side walls **14*b*", 15*b*" and 15*b*", 16*b*" of the mutually adjacent adapter segments 4, 5 and 5, 6 in substantially straight continuation of the main extension planes of the side walls 14*b*", 15*b*" and 15*b*", 16*b*". The intermediate portions 11" can here, see FIG. 17**, be configured as substantially solid, elastic or rubber-like plate portions.

In the area of the adapter segments 4, 5 and 6, the first plastic material is used in the adapter body 2", while the second plastic material, which is elastic and, for example, rubber-like after solidification, is used to form the intermediate portions 11". In particular, the adapter body 2" is formed with a one-piece component injection-molded or 3D-printed from the first and second plastic materials in a single pass. In the adapter 1", bottom elements 44, 45, 46 are also preferably formed from the first plastic material.

While in the embodiment examples shown in FIGS. 1 to 17 the adapter 1, 1' or 1" comprises three adapter segments 4, 5, 6 respectively, it is understood that in further, modified embodiment examples two adapter segments or more than three adapter segments, for example four or five, may be provided.

Although the present invention has been fully described above with reference to the preferred exemplary embodiments, it is not limited to these exemplary embodiments and can be modified in a variety of other ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Austrian application No. A50831/2023, filed Oct. 11, 2023, are incorporated by reference herein.

LIST OF REFERENCE SIGNS

1, 1', 1" Adapter
2,2', 2" adapter body
3 Longitudinal extension (adapter body)
4, 5, 6 adapter segment
7, 7', 7", 8, 8', 8" connecting region
9 first bending axis
10 second bending axis

11, 11' corrugation structure
11" elastic intermediate portion
12 corrugation peak
13 corrugation trough
14*a*, 15*a*, 16*a* lid portion
14*b*, 15*b*, 16*b* side wall
14*b*', 15*b*', 16*b*' side wall
14*b*", 15*b*", 16*b*" side wall
14*c*, 15*c*, 16*c* interior
17, 18, 19 flat carrier component
20,21 tape-like or foil-like, flexible connection
22 bottom (U-shape)
23 transverse direction (adapter)
24*a*, 25*a*, 25*b*, 26*a* narrow side edge
28 convex contour
29 concave contour
30 chamfer
44, 45, 46 bottom element
50 coupling device
64, 66 contact elements
70 latching elements
100, 100' mounting track
101 path
102 longitudinal extension (mounting track)
103 mounting slot
130 mounting slot
104 depth direction (mounting slot)
140 depth direction (mounting slot)
106 conductor device (mounting track)
150 lighting unit
200, 300, 400 lighting arrangement
E1, E2 inserting direction

What is claimed:

1. An adapter for a track lighting system comprising a mounting track being shaped at least in sections to follow a curved path and being provided with at least one mounting slot along a longitudinal extension of the mounting track, wherein the adapter can be inserted into the at least one mounting slot for electrical contacting of a conductor device of the mounting track, wherein the adapter comprises an adapter body which is divided into two or more adapter segments along a longitudinal extension of the adapter body, wherein in each case mutually adjacent adapter segments are connected to one another in a connecting region, wherein the connecting region in each case enables the adapter body to be flexibly bent about at least two bending axes and wherein the two bending axes are not parallel to one another and in each case run non-parallel to the longitudinal extension of the adapter body, and wherein the adapter body is configured to be more flexible in the connecting region than in the region of the adapter segments, wherein the connecting region in each case is configured with at least one corrugation structure with corrugation peaks and corrugation troughs.

2. The adapter according to claim 1, wherein the two bending axes are substantially perpendicular to each other and/or run substantially perpendicular to the longitudinal extension of the adapter body.

3. The adapter according to claim 1, wherein directions of the crests of the corrugation peaks and the bottoms of the corrugation troughs run non-parallel to the longitudinal extension of the adapter body.

4. An adapter for a track lighting system comprising a mounting track being shaped at least in sections to follow a curved path and being provided with at least one mounting slot along a longitudinal extension of the mounting track, wherein the adapter can be inserted into the at least one mounting slot for electrical contacting of a conductor device of the mounting track, wherein the adapter comprises an adapter body which is divided into two or more adapter segments along a longitudinal extension of the adapter body, wherein in each case mutually adjacent adapter segments are connected to one another in a connecting region, wherein the connecting region in each case enables the adapter body to be flexibly bent about at least two bending axes and wherein the two bending axes are not parallel to one another and in each case run non-parallel to the longitudinal extension of the adapter body, and wherein the adapter body is configured to be more flexible in the connecting region than in the region of the adapter segments, and wherein the adapter body comprises a box-like shape and the adapter segments are each configured with a lid portion, side walls and an interior.

5. The adapter according to claim 4, wherein in each case in the connecting region, mutually adjacent edge regions of the side walls of the mutually adjacent adapter segments are connected by a corrugation structure with corrugation peaks and corrugation troughs, or wherein in each case in the connecting region, mutually adjacent edge regions of the side walls of the mutually adjacent adapter segments are connected by an elastic intermediate portion.

6. The adapter according to claim 5, wherein the crests of the corrugation peaks and bottoms of the corrugation troughs run substantially parallel to the side walls connected by the corrugation structure.

7. The adapter according to claim 4, wherein at least one flat carrier component is accommodated in the interiors of at least two of the adapter segments adjacent to one another, wherein the flat carrier component carries electrical conductors and wherein the flat carrier components of the adapter segments adjacent to one another are connected to one another and electrically coupled via a tape-like or film-like, flexible connection.

8. The adapter according to claim 7, wherein the flat carrier component is accommodated in the interior in each case substantially parallel to the lid portion between the side walls.

9. The adapter according to claim 7, wherein the tape-like or film-like, flexible connection in the connecting region is formed with a tape-like or film-like, flexible material which carries conductive traces and is arranged bent in a U-shape in the connecting region.

10. The adapter according to claim 9, wherein in each case in the connecting region, mutually adjacent edge regions of the side walls of the mutually adjacent adapter segments are connected by a corrugation structure with corrugation peaks and corrugation troughs and wherein the U-shape is arranged in a transverse direction of the adapter between two of the corrugation structures of the connecting region; or wherein in each case in the connecting region, mutually adjacent edge regions of the side walls of the mutually adjacent adapter segments are connected by an elastic intermediate portion and wherein the U-shape is arranged in a transverse direction of the adapter between two of the elastic intermediate portions of the connecting region.

11. The adapter according to claim 4, wherein a gap is provided between mutually facing narrow side edges of the lid portions of the mutually adjacent adapter segments in an unbent state of the adapter body, wherein the narrow side edge of a first of the lid portions is formed with a convex contour as seen in a main extension plane of the first lid portion and the narrow side edge of a second of the lid portions is formed with a concave contour as seen in a main extension plane of the second lid portion, and the convex and concave contours mesh with each other in such a way that the gap remains in the unbent state.

12. The adapter according to claim 11, wherein the narrow side edge of the second lid portion is provided with a chamfer within the concave contour.

13. The adapter according to claim 1, wherein the mutually adjacent adapter segments are integrally connected in the connecting region and/or wherein the adapter body is made of at least one plastic material.

14. The adapter according to claim 1, wherein the adapter body is configured in the adapter segments with a first plastic material and in the connecting regions a second plastic material which is different from the first plastic material; and/or wherein the adapter body is manufactured using an injection molding process or a 3D printing process; and/or wherein the two bending axes are substantially perpendicular to each other and/or run substantially perpendicular to the longitudinal extension of the adapter body.

15. A lighting arrangement, comprising:

a mounting track being shaped at least in sections to follow a curved path being provided with at least one mounting slot along a longitudinal extension of the mounting track and comprising a conductor device;

at least one adapter, which is inserted into the at least one mounting slot and is in electrical contact with the conductor device; and a lighting unit for generating light, which is coupled to the adapter and can be supplied by means of the adapter at least with electric power provided by the conductor device for operating the lighting unit or at least with electric power provided by the conductor device and a control signal provided by the conductor device;

wherein the at least one adapter comprises an adapter body which is divided into two or more adapter segments along a longitudinal extension of the adapter body, wherein in each case mutually adjacent adapter segments are connect-ed to one another in a connecting region, wherein the connecting region in each case enables the adapter body to be flexibly bent about at least two bending axes and wherein the two bending axes are not parallel to one another and in each case run non-parallel to the longitudinal extension of the adapter body, and wherein the adapter body is configured to be more flexible in the connecting region than in the region of the adapter segments;

wherein the mounting track comprises at least two such mounting slots and wherein the lighting arrangement comprises at least two such adapters, which are each inserted into one of the mounting slots at least in sections opposite one an-other within a portion of the mounting track within which the path is curved.

16. The lighting arrangement according to claim 15, wherein the path is a flat curve and at least in one portion of the mounting track a depth direction of the at least one mounting slot deviates from a normal to the plane of the curve, or wherein the path is a three-dimensional curve and at least in one portion of the mounting track a depth direction of the at least one mounting slot deviates from a binormal of an accompanying tripod of the three-dimensional curve.

17. The adapter according to claim 1, wherein directions of the crests of the corrugation peaks and the bottoms of the corrugation troughs run substantially perpendicular to the longitudinal extension of the adapter body.

18. The adapter according to claim 4, wherein in each case in the connecting region, mutually adjacent edge regions of the side walls of the mutually adjacent adapter segments are connected by a plate-like or wall-like elastic intermediate portion.

19. The adapter according to claim 18, wherein the plate-like or wall-like elastic intermediate portion is configured as a substantially planar continuation of a main extension surface of one of the side walls in the direction of an adjacent one of the side walls.

20. The adapter according to claim 7, wherein the flat carrier component carries also electronic components and/or electrical contacting devices.

21. The adapter according to claim 9, wherein a bottom of the U-shape runs substantially parallel to the lid portions in an unbent state of the adapter.

* * * * *